Nov. 7, 1950     E. D. SMYSER     2,528,617
ROTARY FLUID MOTOR
Filed Nov. 13, 1944     2 Sheets-Sheet 1
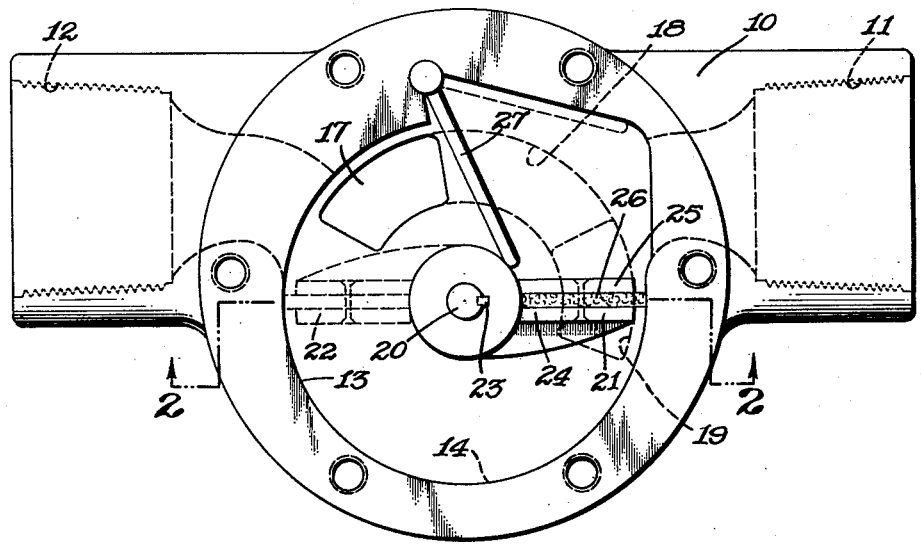
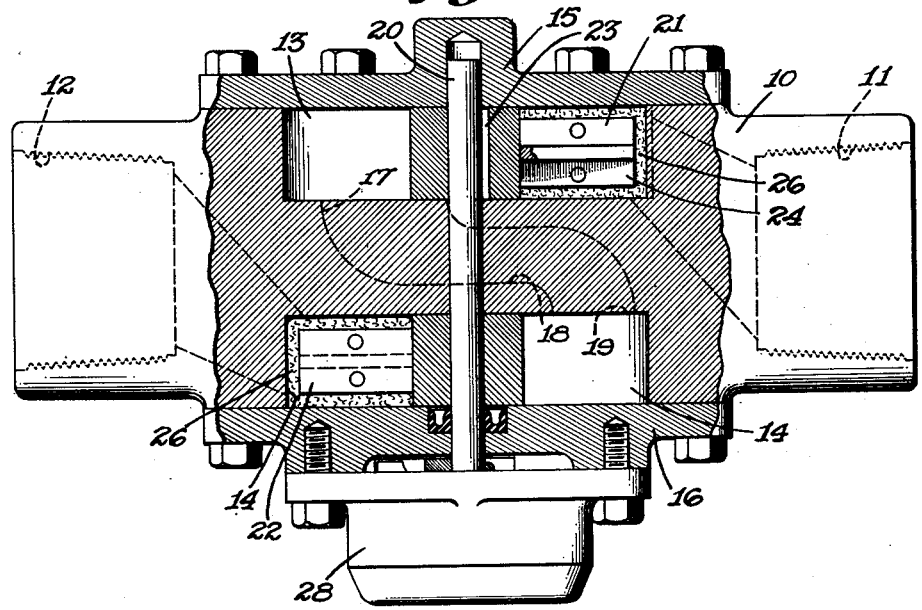
Elmer D. Smyser
INVENTOR.
BY
Hazard and Miller
ATTORNEYS Nov. 7, 1950  E. D. SMYSER  2,528,617
ROTARY FLUID MOTOR
Filed Nov. 13, 1944  2 Sheets-Sheet 2

ELMER D. SMYSER
INVENTOR.

BY
Hazard and Miller
ATTORNEYS

Patented Nov. 7, 1950

2,528,617

UNITED STATES PATENT OFFICE 2,528,617

ROTARY FLUID MOTOR

Elmer D. Smyser, Torrance, Calif., assignor of one-half to Fred C. Ripley, Los Angeles, Calif.

Application November 13, 1944, Serial No. 563,277

2 Claims. (Cl. 121—78)

This invention relates to improvements in rotary fluid motors.

An object of the invention is to provide an improved rotary fluid motor of relatively simple, durable, and economical design that can be incorporated in a pipe line and which will indicate with reasonable accuracy the volumetric flow through the pipe line.

In many oil fields a plurality of oil wells are connected together so as to discharge into a common tank or into a manifold common to all of the oil wells. The total production of all of the wells so connected can be adequately measured in the tank, but usually heretofore no metering device has been incorporated in the pipe line leading to the tank from each oil well. As a result, if the production of any one or more of the wells drops this fact is indicated by the drop in the total production of the entire plurality of wells. However, it is frequently difficult to ascertain which well or wells have dropped in their production so that curative measures may be taken to restore production of such well. This is particularly true where wells are flowing by heads and the rate of flow from each well is not constant.

An object of the invention is to provide a relatively simple and durable rotary fluid motor useable as a flow meter that can be incorporated in the pipe line leading from each well to a common tank or manifold and which will indicate the volume of flow with reasonable accuracy from each well to a common tank or manifold and which will indicate the volume of flow with reasonable accuracy from each well. Consequently, should one or more wells drop in their production the particular well or wells that have dropped in production can be instantly ascertained from the reading of the flow meter and appropriate steps taken to stimulate production of such wells and bring them back to normal.

As the oil delivered from many wells carries with it sand and grit, another object of the invention is to provide a flow meter which is so designed that it will enable such sand or grit to be passed therethrough without causing undue wear, binding or jamming of any parts of the flow meter.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the improved rotary fluid motor or flow meter, one cover plate of the flow meter being illustrated as having been removed;

Fig. 2 is a sectional view taken substantially upon the line 2—2 upon Fig. 1 in a direction indicated;

Figure 3:
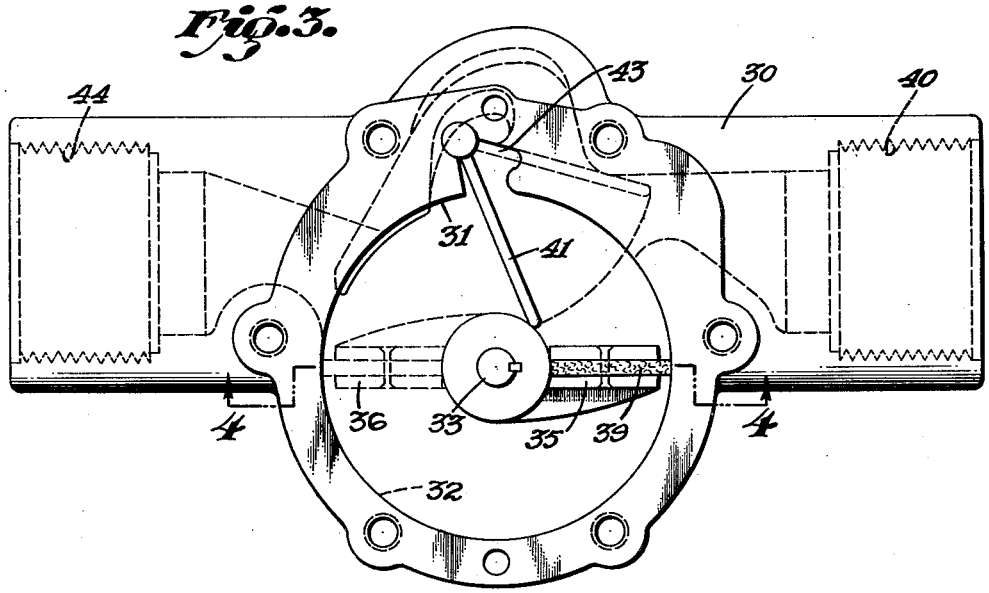
Fig. 3 is a view similar to Fig. 1 but illustrating a modified form of construction.

Referring to the accompanying drawings wherein similar reference characters designate similar parts throughout, the improved rotary fluid motor or flow meter comprises a body 10 having an inlet 11 and an outlet 12 internally threaded for connection with a pipe line through which the fluid such as the oil from an oil well is caused to flow. In this body there are two chambers 13 and 14, which are normally closed by means of cover plates 15 and 16. These chambers are in mutual communication with each other and with the inlet and outlet, respectively. Thus, the inlet 11 leads to one side of chamber 13, the outlet from this chamber being formed by a port 17 provided at one end of a generally semi-circular duct or passage 18 formed in the central portion of the body 10. This duct in turn discharges through a port 19 into chamber 14 and the outlet from this chamber is through the outlet 12. A rotary shaft 20 extends transversely through the body and through both chambers. This shaft has pistons 21 and 22 keyed thereon such as by keys 23. The pistons on the shaft are circumferentially displaced from each other being preferably arranged 180° apart as illustrated. Each piston comprises a hubbed blade body 24 having a companion plate 25. Between the companion plate and the body 24 there is a section of flexible material 26 which wipingly engages the interior of its chamber. The outer edges of each blade and its companion plate are preferably spaced with considerable clearance from the interior of each chamber so that any sand or grit carried by the oil may readily pass through this clearance and the resiliency of the flexible material may, if required, enable the flexible material to pass thereover. In the top of each chamber there is swingably mounted a gate 27, the two gates in the two chambers being arranged in direct alignment with each other. These gates are normally urged by the pressure of the fluid flowing through the flow meter toward the shaft 20. They serve to direct the flow through each chamber in a uni-directional manner. A means for indicating the rotation of shaft 20 is provided which in situations where the flow is relatively steady, may be in the nature of a tachometer. However, inasmuch as the flow from an oil well is seldom constant, I prefer to employ a mere counting mechanism indicated at 28, which serves to count the number of revolutions of the shaft. This is indicative of the volume of flow that has passed through the flow meter from the oil well to the tank.

The operation of the above-described flow meter is substantially as follows: The fluid, such as oil, enters the meter through the inlet 11 and is directed by the gate 27 in chamber 13 to flow through that chamber in a clockwise direction as viewed in Fig. 1. The flow on encountering the impeller in this chamber causes a partial rotation of the shaft 20. When the piston exposes or uncovers port 17 the fluid may then pass through duct 18 and port 19 into chamber 14 where it is caused to also flow in a clockwise direction, as viewed in Fig. 1, by reason of the gate 27 that is disposed in this chamber. The fluid then acts on piston 22 completing the rotation of the shaft 20 until the outlet 12 is exposed following which the fluid may escape through the outlet.

By the above-described construction it will be appreciated that the shaft 20 will be caused to rotate continuously and steadily as long as flow is taking place from inlet 11 to outlet 12 and by the use of two chambers with pistons in each which are circumferentially spaced from each other there is no opportunity for dead-center conditions to exist which would cause shaft 20 to stop rotating. Although each time a piston passes beneath a gate 27 and lifts it and flow might take place beneath the gate directly from inlet 11 to port 17, this momentary condition is unobjectionable in that all fluid passing through port 17 must encounter piston 22 in chamber 14 before escaping to outlet 12. Similarly, when piston 22 is in a position displacing its gate 27 piston 21 will be in such position that the gate 27 in chamber 13 is seating against the hub and causing anti-directional flow in chamber 13. In this manner, the rotation of shaft 20 is always indicative of the volume of flow through the flow meter and by keeping proper records of the number of rotations of the shaft by means of the counting mechanism a reduction in the production of any oil well can be constantly ascertained from the flow meters in the lines leading from the plurality of wells to the tank.

Figure 4:
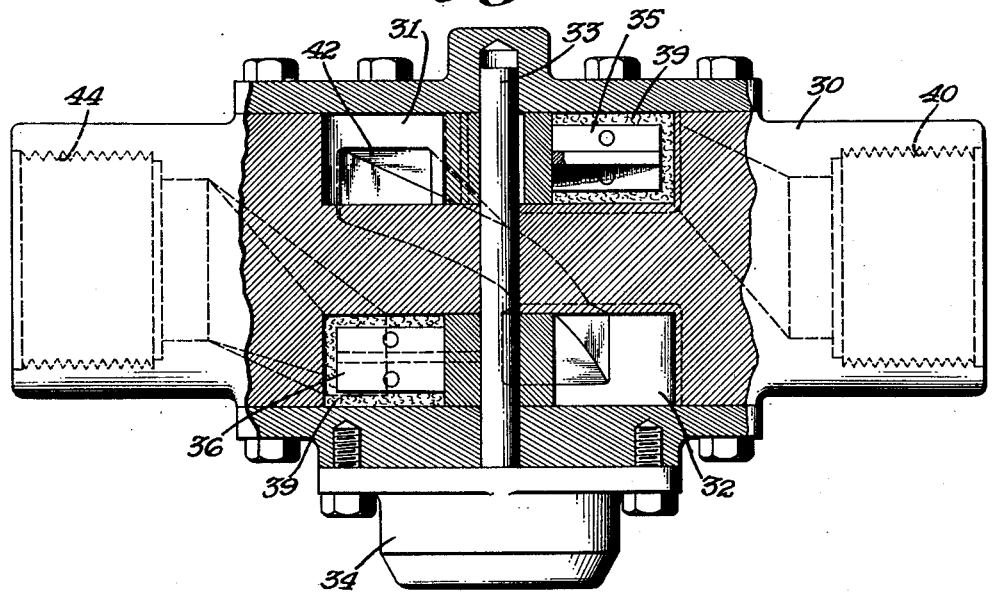
Fig. 4 is a sectional view taken substantially upon the line 4—4 in the direction indicated.

In Figs. 3 and 4 there is illustrated a modified form of construction consisting of a body 30 internally threaded at its ends for attachment to a pipe to which the fluid is to be conducted. In this body there are provided two circular chambers 31 and 32. The rotor shaft 33 which operates the counter 34 extends through both chambers and has the blades 35 and 36 mounted thereon in diametrically opposed positions. These blades cooperate with their companion plates to hold the sections of flexible material 39 therebetween which wipe their respective chambers. The inlet 40 discharges into chamber 31 above the pivoted gate 41. Chamber 32 has a similar gate 43 in transverse alignment with gate 41. However, in this form of construction the duct or passage 42 which establishes communication between the two chambers 31 and 32 extends upwardly and then downwardly so as to discharge against the top of the gate 43 which is in chamber 32. In this manner, fluid entering chamber 31 and passing into the duct 42 after having rotated the piston in chamber 31 is caused to discharge against the upper side of the gate 43 and urge it downwardly against the rotor. The fluid after passing above the downwardly urged gate 43 passes around chamber 32 and eventually passes out of the measuring device through the outlet 44. This form of construction may be employed where the fluid may contain and be carrying sticky substances which might tend to cause the gate 43 to stick or remain in its uppermost position. By arranging the duct 42 so as to discharge against this gate any tendency to stick is entirely overcome.

While the improved flow meter has been primarily designed for measuring the flow from oil wells to a common tank, it will be readily appreciated that it may be employed for measuring the flow of fluids through other pipe lines or conduits where a reasonably accurate indication of the volume of fluid that has passed through the pipe line is desired. The improved flow meter is of relatively simple and sturdy construction and is highly efficient in that loss of head occasioned by the fluid flow therethrough is relatively low.

Various changes may be made in the details of construction without departing from the spirit and scope of the invention as defined by the appended claims.

I claim:

1. A flow meter comprising a body having first and second chambers arranged in side by side relationship, said body having oppositely positioned bosses, one of the bosses being apertured and internally threaded to provide an inlet leading to the forward side of the first chamber only, the other boss being apertured and internally threaded to provide an outlet leading from the rear of the second chamber only, the inlet and outlet being in line with one another, the internally threaded bosses being positioned on opposite sides of the chambers and enabling the flow meter to be inserted in a pipe line, a shaft extending through both chambers, pistons mounted upon said shaft and disposed in said chambers respectively, gates swingably mounted in the chambers adapted to engage the forward sides of the pistons to cause uni-directional flow through the chambers and thus cause the pistons to drive the shaft by the flow, said body being hollowed out to provide a duct leading from the rear side of the first chamber to the forward side of the second chamber forwardly of the gate therein whereby fluid entering from the inlet may drive the piston in the first chamber and then flow through the duct into the second chamber to drive the piston therein before discharging through the outlet.

2. A flow meter adapted to be positioned in a pipe line comprising a body having first and second chambers arranged in side by side relationship, said body having oppositely positioned bosses, one of the bosses being apertured and internally threaded to provide an inlet leading to the forward side of the first chamber only, the other boss being apertured and internally threaded to provide an outlet leading from the rear of the second chamber only, the inlet and outlet being in line with one another, the internally threaded bosses being positioned on opposite sides of the chambers and enabling the flow meter to be inserted in a pipe line, a shaft extending through both chambers, a pair of hollow cylindrical hubs fixedly mounted on the shaft, one hub being positioned in the first chamber and the other hub being positioned in the second chamber, a blade extending from each hub providing a piston for each hub, each piston presenting a relatively thin flexible radially extending edge which wipingly engages the walls of the chamber as the piston rotates, said pistons being arranged at approximately 180° from each other, gates swingably mounted in the chambers adapted to engage the forward sides of the hub to cause uni-directional flow through the chambers and thus causing the pistons to drive the shaft by the flow, said body being hollowed to provide a duct leading from the rear side of the first chamber to the forward side of the second chamber forwardly of the gate therein whereby fluid entering the inlet may drive the piston in the first chamber and then flow through the duct into the second chamber to drive the piston therein before discharging from the outlet, the bladed pistons having cam edges extending along the forward sides thereof which engage the gates as the pistons rotate.

ELMER D. SMYSER.

REFERENCES CITED

The following references are of record in the file of this patent:

UNITED STATES PATENTS

| Number | Name | Date |
|---|---|---|
| 203,812 | Austin | May 21, 1878 |
| 601,854 | Meyer | Apr. 5, 1898 |
| 609,711 | Sullivan | Aug. 23, 1898 |
| 981,660 | Kinney | Jan. 17, 1911 |
| 1,016,129 | Constock | Jan. 30, 1912 |
| 1,153,086 | Hupe | Sept. 7, 1915 |
| 1,234,392 | Roberts | July 24, 1917 |
| 1,582,961 | Berrenberg | May 4, 1926 |
| 1,952,882 | Morgan | Mar. 27, 1934 |
| 2,042,725 | Montelius | June 2, 1936 |
| 2,342,997 | Bassett | Feb. 29, 1944 |

FOREIGN PATENTS

| Number | Country | Date |
|---|---|---|
| 386,171 | Germany | Dec. 4, 1923 |